United States Patent [19]
Schlatter

[11] 3,735,633
[45] May 29, 1973

[54] FUNCTION GENERATOR AND COMPONENTS THEREOF

[75] Inventor: Gerald Lance Schlatter, Boulder, Colo.

[73] Assignee: International Telephone and Telegraph Corporation, New York, N.Y.

[22] Filed: Mar. 15, 1971

[21] Appl. No.: 124,070

[52] U.S. Cl. ....................................................73/32
[51] Int. Cl. ..............................................G01n 9/00
[58] Field of Search..........................73/30, 32, 67.1, 73/67.2

[56] References Cited

UNITED STATES PATENTS

| | | | |
|---|---|---|---|
| 2,635,462 | 4/1953 | Pode et al. | 73/32 |
| 3,117,440 | 1/1964 | Wilner | 73/32 |
| 3,307,408 | 3/1967 | Thomas et al. | 73/462 |
| 3,426,593 | 2/1969 | Jacobs | 73/32 X |
| 3,444,723 | 5/1969 | Wakefield | 73/32 |

FOREIGN PATENTS OR APPLICATIONS

| | | | |
|---|---|---|---|
| 129,357 | 6/1959 | U.S.S.R. | 73/194 B |

Primary Examiner—Richard C. Queisser
Assistant Examiner—Arthur E. Korkosz
Attorney—C. Cornell Remsen, Jr., Walter J. Baum, Paul W. Hemminger and Charles L. Johnson, Jr.

[57] ABSTRACT

A vibration densitometer that computes and transmits the difference between actual density and a known, constant reference density. A pulse former circuit produces a pulse train useful in producing a linear density difference analog. Two integrators and one sample and hold circuit are employed in the computation. A single one shot actuates both integrators and the sample and hold circuit. A scale factor circuit is employed for calibration and to convert the difference analog to an analog of absolute density. The difference density analog makes possible the computation and transmission of density data with an extraordinarily high degree of accuracy. However, the difference density analog is produced with a very small, unique system.

4 Claims, 8 Drawing Figures

INVENTOR.
GERALD L. SCHLATTER
BY
ATTORNEY

INVENTOR.
GERALD L. SCHLATTER
BY
ATTORNEY

3,735,633

FUNCTION GENERATOR AND COMPONENTS THEREOF

BACKGROUND OF THE INVENTION

This invention relates to devices for producing an electrical output signal which is a predetermined function of an input signal thereto, and more particularly, to analog computer systems or the like and subsystems thereof.

Although the device of the present invention will have application in fields other than those disclosed herein, the invention has been found to possess considerable utility when employed as a vibration densitometer of the type disclosed in copending application Ser. No. 65,371, now U.S. Pat. No. 3,677,067, filed Aug. 20, 1970, by C. E. Miller and G. L. Schlatter for DENSITOMETER.

The output analogs of prior art vibration densitometers have been relatively inaccurate. Moreover, the equipment required to produce such analogs has been very complicated.

SUMMARY OF THE INVENTION

In accordance with the device of the present invention, the abovedescribed and other disadvantages of the prior art are overcome by providing means to produce a density difference signal in accordance with the difference between the density of a fluid and a known, constant density. Computation and data transmission accuracy is thereby improved. Further, several unique circuits are employed to make the output analog directly proportional to the density difference. These circuits require very few, inexpensive component parts. A scale factor circuit is also a feature of the invention. The scale factor circuit makes calibration possible, and a return to absolute density, if desired.

The above-described and other advantages of the present invention will be better understood from the following detailed description when considered in connection with the accompanying drawings.

BRIEF DESCRIPTION OF THE DRAWINGS

In the drawings which are to be regarded as merely illustrative.

DESCRIPTION OF THE PREFERRED EMBODIMENT

Figure 1:
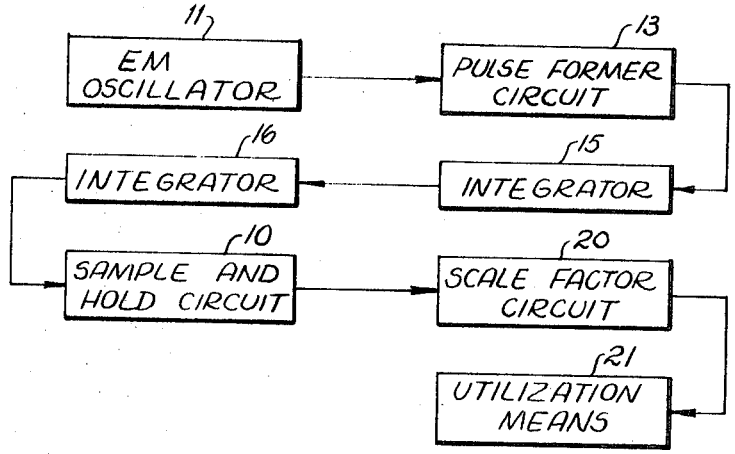
FIG. 1 is a block diagram of one embodiment of the system of the present invention.

In the drawings in FIG. 1, a pulse former circuit 13, a first integrator 15, a second integrator 16, a sample and hold circuit 10, a scale factor circuit 20, and utilization means 21 are connected in succession from an electromechanical oscillator 11.

A vibration densitometer is, what may be described as, an electromechanical oscillator. A structure adapted to be vibrated is thus immersed in a fluid, and driven at its own natural resonant frequency. The said natural resonant frequency changes according to a predetermined function of the fluid density.

In accordance with the foregoing, oscillator 11 may include all of the structure illustrated in FIGS. 1 through 6, inclusive, of said copending application. It may also include all of the blocks shown in FIG. 7 of said copending application except linearization circuit 109 and indicator 110.

In driving the structure to be vibrated in said copending application, a tracking filter is employed. The output of the tracking filter may be employed as the input to circuit 13 shown in FIG. 1 in the instant application.

Utilization means 21 may be simply an indicator, if desired. The indicator may simply be a voltmeter calibrated in density. However, utilization means may also be any conventional rate of mass flow or total mass flowmeter or other device that requires a density analog input that is provided by scale factor circuit 20. Further, current analogs may be employed simply by connecting a voltage to current converter anywhere that the same is desired in the system of FIG. 1. As will be apparent, utilization means 21 is not limited to a device to indicate density, but may be employed in a mass flowmeter or other device requiring a controlling input voltage or current which changes in accordance with fluid density.

Figure 2:
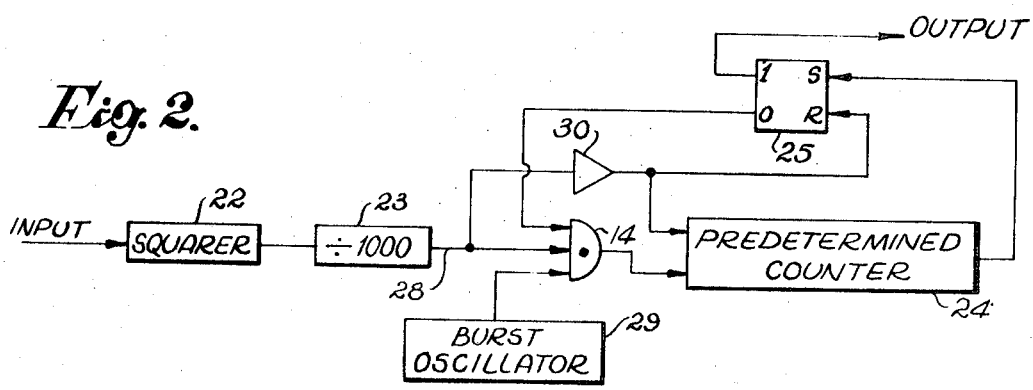
FIG. 2 is a block diagram of a pulse former circuit shown in FIG. 1.
Figure 3:
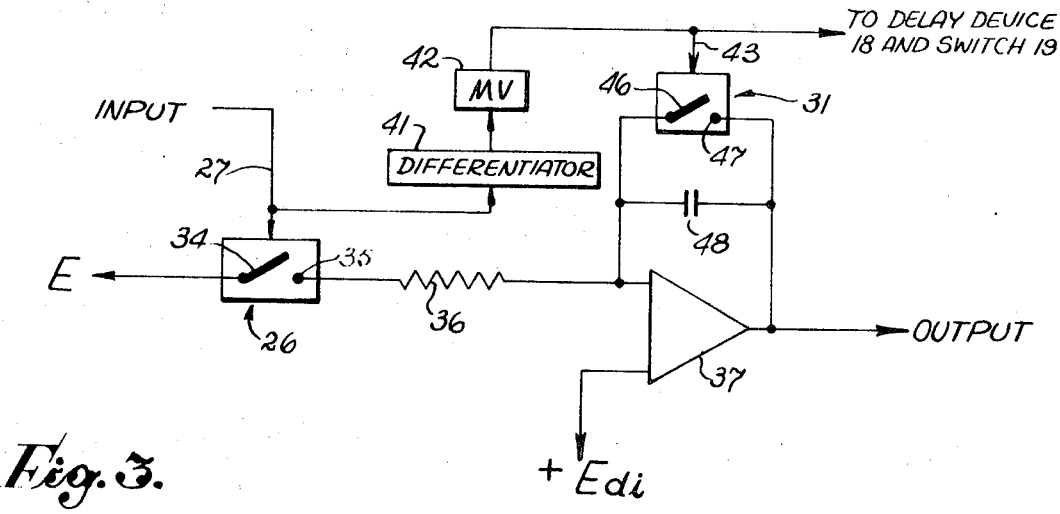
FIG. 3 is a schematic diagram of an integrator shown in FIG. 1.

As shown in FIG. 2, a squarer 22, a frequency divider 23, an AND gate 14, a predetermined counter 24 and a flip-flop 25 are connected from the output of oscillator 11 to a switch 26 in FIG. 3. The "1" output of flip-flop 25 is connected to an input lead 27 of switch 26. All the switches disclosed herein may be electromechanical or electrical, but preferably are electronic switches including, but not limited to, transistor switches. Thus, the signal on input lead 27 of switch 26 closes switch 26 when the "lead" output of flip-flop 25 is high.

If the output of the said tracking filter is fairly square, squarer 22 need not be employed. In this case, the output of the tracking filter may be connected either directly to the input of divider 23, or directly to the input lead 28 of gate 14. If the tracking filter is connected to the input lead 28, divider 23 may thus be eliminated. Divider 23 is thus optional. As shown, divider 23 divides by 1,000. This number, too, is also optional.

A burst oscillator 29 is connected to a second input of gate 14. The "0" output of flip-flop 25 is connected to a third input of gate 14. The output of gate 14 is connected to the input of counter 24. An inverter 30 is connected from lead 28 to the reset input of flip-flop 25. The output of inverter 30 is also connected to the reset input of counter 24.

Figure 7:
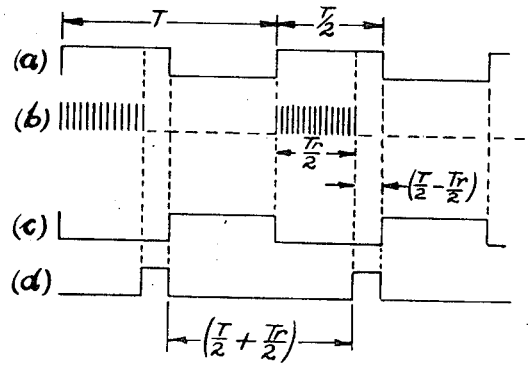

The operation of the pulse former circuit 13 of FIG. 2 may, perhaps, be best understood from the waveforms shown in FIG. 7. Pulse former circuit 13 converts waveform (a) to waveform (d). The output of divider 23 is indicated by waveform (a). The output of gate 14 is indicated by waveform (b). Gate 14 passes a burst of pulses from oscillator 29 to counter 24 over a period which may be called $T_r / 2$. The high output of divider 23 keeps gate 14 open. Initially, flip-flop 25 is in the "0" state and thus does not inhibit gate 14. Counter 24 then counts up burst pulses and stops counting a period of time $T_r/2$ after the leading edge of of each output pulse of divider 23. Counter 24 may be adjustable as to its predetermined count, if desired. Burst oscillator 29 produces pulses at a high stable, constant frequency.

Once the burst of pulses has been counted, counter 24 sets flip-flop 25 to the "1" state. The "0" output of flip-flop 25 then goes low and inhibits gate 14. No further pulses are then introduced to counter 24 until the leading edge of the next output pulse from divider 23. The output of inverter 30 is shown in waveform (c). When waveform (a) goes low, waveform (c) goes high, and both counter 24 and flip-flop 25 are reset. The "1" output of flip-flop 25 is thus illustrated in waveform (d).

As will be evident from the following description, the vertical input leads to switches 26, 31, 32, 33 and 19 represent the actuating input lead. As described previously, the actuating input lead carries a voltage which, when high, causes the switch to close. Switch 26 effectively has an arm 34 and a contact 35. A constant voltage, E, is connected to arm 34. A resistor 36 is connected between contact 35 and one input of a differential amplifier 37. The other input of differential amplifier 37 is connected to a constant voltage, $E_{dt}$. The input to switch 26 on lead 27 is connected from the "1" output of flip-flop 25 shown in FIG. 2, as stated previously. The output of amplifier 37, as in FIG. 3, is connected to an input lead 38 connected to an effective arm 39 of the switch 32, switch 32 having an effective contact 40.

In FIG. 3, a differentiator 41 is connected from lead 27 to a monostable multivibrator 42. The output of multivibrator 42 is connected to the actuating lead 43 of switch 31. The output of multivibrator 42 is also connected to an input lead 44 of a delay device 18 shown in FIG. 4, and to an actuating input lead 45 of switch 19 shown in FIG. 5.

In FIG. 3, switch 31 has an effective arm 46, and a contact 47. A capacitor 48 is connected from the output of amplifier 37 to the input thereof to which resistor 36 is connected. Arm 46 is connected to one electrode of capacitor 48, and contact 47 is connected to the other electrode thereof.

In the operation of the first integrator 15, shown in FIG. 3, the input to switch 26 on lead 27 closes switch 26 each time and a length of time that flip-flop 25 is in the "1" state. That is, switch 26 is closed during the widths of the pulses indicated in waveform (d). The integrator of FIG. 3, therefore, integrates during at least a portion of this time. However, due to the fact that integration is performed not only during the pulses of waveform (d), but also during the time between those pulses, one of the first and second integrators 15 and 16 of FIGS. 3 and 4, respectively, must reset during its own integration interval. It is the first integrator 15 of FIG. 3 that does this.

Differentiator 41 produces an output pulse at the leading edge of each of the pulses in waveform (d). Multivibrator 42 then produces an output pulse having a leading edge coincided with the leading edge of each of the pulses of waveform (d) and having a trailing edge occurring before the trailing edges of the pulses of waveform (d). The output of multivibrator 42 is indicated by waveform (f) in FIG. 8. Waveform (e) is the same as waveform (d) although the scale thereof has been changed for clarity.

Receipt by switch 31 of the multivibrator output causes the capacitor 48 to discharge. Capacitor 48 is thus shunted through switch 31.

Figure 8:
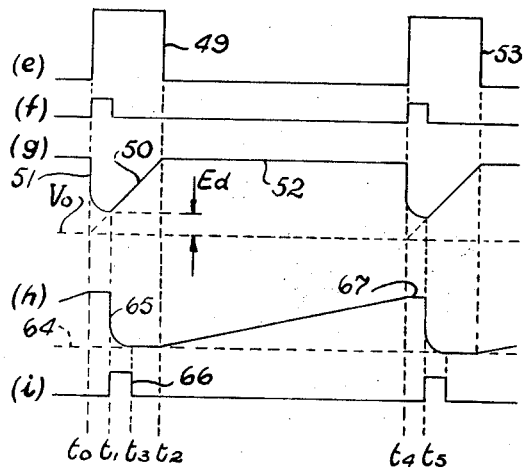
FIGS. 7 and 8 are graphs of groups of waveforms characteristic of the operation of the invention.

If capacitor 48 were completely discharged, at a time, $t_1$, shown in FIG. 8, the integrator would integrate from the zero line, $V_o$, starting at time, $t_1$, since it is the object of the integrator of FIG. 3 to produce a maximum output at a time, i $t_2$, which is directly proportional to the time width of pulse 49 shown in FIG. 8, an error would be introduced because the time $(t_1 - t_0)$ would be omitted.

In accordance with the device of the present invention, this error is eliminated by preventing the output of amplifier 37 from falling below a predetermined constant voltage, $E_d$, by supplying a suitable bias to amplifier 37, i.e., $E_{dt}$. This provides the bias sufficient to maintain $E_d = St_r$, where S is the slope of line 50, and $t_r = t_1 - t_0$. Note that the line 50 thus extends precisely through the point $t_0$, $V_o$ and makes the integration accurate for the entire width of pulse 49.

In accordance with the foregoing, as shown in FIG. 8, the output of amplifier 37 drops along the line 51, integrates along the line 50 and remains constant at 52 over a period between the trailing edge of pulse 49 and the leading edge of pulse 53. The output of amplifier 37 remains constant during the interval along the line 52 because during this period switch 26 is opened.

Figure 4:
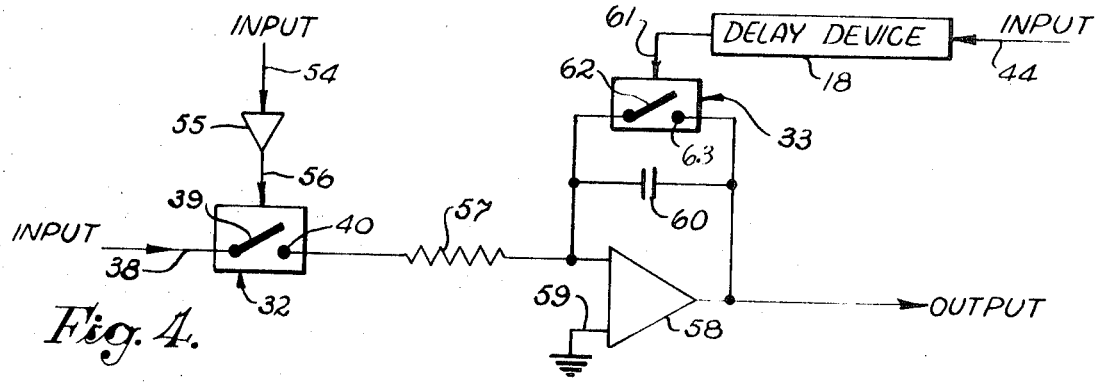
FIG. 4 is a schematic diagram of another integrator shown in FIG. 1.

In FIG. 4, an input head 54 is connected from the "1" output of flip-flop 25. An inverter 55 is connected from lead 54 to the actuating input lead 56 of switch 32. As stated previously, input lead 38 is connected from the output of amplifier 37. A resistor 57 is connected from switch contact 40 to one input of an amplifier 58. The other input is grounded at 59. As before, a capacitor 60 is connected from the output to the input of amplifier 58 which is connected to resistor 57. A delay device 18 is connected from an input lead 44 to an actuating input lead 61 of switch 33. Switch 33 has an effective pole 62, and a contact 63. Pole 62 is connected to one electrode of capacitor 60. Contact 63 is connected to the other electrode of capacitor 60. The output of delay device 18 is indicated by waveform (i) in FIG. 8. However, the pulse width and location of the output pulses of delay device 18 need not be exactly the same as that of waveform (i).

Since reset occupies a portion of the widths of pulses 49 and 53 for the first integrator 15 of FIG. 3, no special precautions need be taken in connection with the second integrator 16 of FIG. 4. Thus, the output pulses of delay device 18 provide for reset. The outputs of amplifiers 37 and 58 are shown in waveforms (g) and (h), respectively. The output of amplifier 58 drops to zero volts at 64 on a line 65 produced by reset pulse 66. The output of amplifier 58 then stays at zero volts between $t_3$ and $t_2$ and integrates from $t_2$ to $t_4$. The inverted pulse input on lead 56 terminates the integration and the output of amplifier 58 remains constant at the line 67 between times $t_4$ and $t_5$.

First and second integrators 15 and 16, effectively integrate for periods from $t_0$ to $t_2$, and from $t_2$ to $t_4$, respectively. Thus, switch 26 is closed for the period from $t_0$ to $t_2$, and switch 32 is closed from $t_2$ to $t_4$.

First integrator 15 shown in FIG. 3, integrates at a rate directly proportional to the constant voltage, E. Thus, second integrator 16 shown in FIG. 4, integrates at a rate directly proportional to the voltage upon input lead 38, this voltage being the output voltage of amplifier 37 in FIG. 3. The voltage on input lead 38 is integrated between $t_2$ and $t_4$ because switch 32 is closed during this time. Sample and hold circuit 10, shown in FIG. 5, includes switch 19 having an effective arm 68 and an effective contact 69. An input lead 70 to switch 19 is connected from the output of amplifier 58, shown in FIG. 4. Switch 19 has an actuating input lead 45 connected from the output of multivibrator 42 shown in FIG. 3. The sample and hold circuit 10 of FIG. 5 thus samples the amplitude of waveform (h) between $t_{10}$ and $t_1$, between $t_4$ and $t_5$, etc. Note that switch 19 is closed over the duration of the pulses of waveform (f). The entire circuit 10 of FIG. 5 may be conventional. A capacitor 71 is connected from switch contact 69 to ground. An amplifier 72 has one input connected from switch contact 69 and another input which is grounded over a lead 73.

Figure 5:
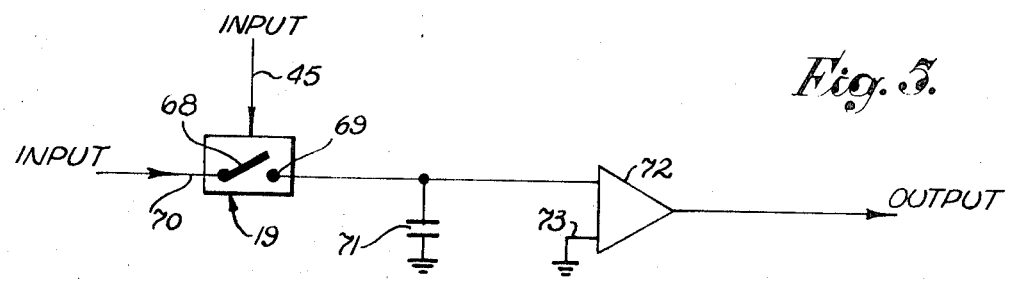
FIG. 5 is a schematic diagram of a sample and hold circuit shown in FIG. 1.
Figure 6:
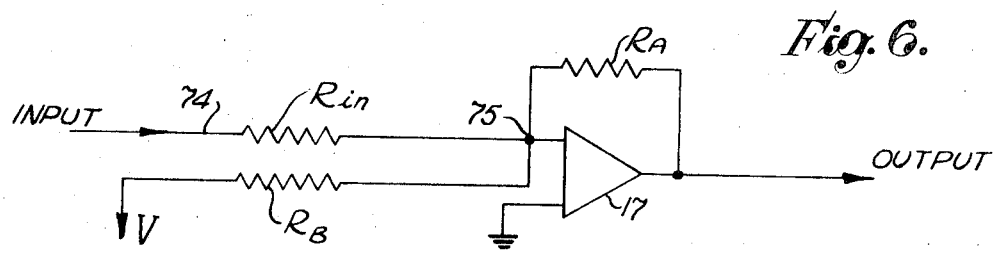
FIG. 6 is a schematic diagram of a scale factor circuit shown in FIG. 1.

Scale factor circuit 20 is shown in FIG. 6 including an input lead 74 which is connected from the output of amplifier 72 in FIG. 5. The circuit of FIG. 6 includes input resistors $R_{in}$ and $R_B$, a feedback resistor $R_A$ and an amplifier 17.

Resistor $R_{in}$ is connected between input lead 74 and a junction 75. Resistor $R_B$ is connected from a point of potential V to junction 75. Resistor $R_A$ is connected from the output of amplifier 17 to junction 75. In equations (8) and (9) to follow, the resistance $R_A$ of resistor $R_A$ may be adjusted or selected to take care of the appropriate constant A in both of the equations (8) and (9). The resistance $R_B$ and resistor $R_B$ and/or the potential V may be adjusted or selected to accurately provide for the constants B, and $d_r$ in equations (8) and (9). The output of amplifier 17 is then connected to utilization means 21, as described previously.

THEORY OF OPERATION

One of the objects of the invention is to produce a D.C. voltage at the output of circuit 10 directly proportional to the density of the fluid in which the densitometer probe is immersed.

If f is the resonant frequency of the oscillator 11, period, T, can be defined as, $$T = 1/f \quad (1)$$

The densitometer of the present invention very accurately reproduces the equation, $$d = AT^2 + B \quad (2)$$

where, $d$ is density, and $A$ and $B$ are constants.

See copending application Ser. No. 65,371 filed Aug. 20, 1970, by C. E. Miller and G. L. Schlatter for DENSITOMETER for the proof.

If $d_r$ is some known, fixed density for a period, $T_r$, then, $$d_r = AT_r^2 + B \quad (3)$$

Subtracting equation (3) from equation (2), $$d - d_r = A(T^2 - T_r^2) \quad (4)$$

Factoring and dividing by four, $$d - d_r = 4A(T/2 - T_r/2)(T/2 + T_r/2) \quad (5)$$

In FIG. 7, the output of divider 23 is indicated at waveform (a). Note that each pulse has a period, T, and that each pulse has a width T/2. In effect, pulse former 13 subtracts a known, constant pulse width from the first portion of each of the pulses (a). Call this portion $T_r/2$. The output pulses of gate 14 are shown at (b). Waveform (c) is (a) inverted. Pulses (d) appear at the output of pulse former 13.

Note that the period between the trailing edges of pulses (d) is T. The period between the trailing edge of the first and the leading edge of the next is thus, $$T - (T/2 - T_r/2) = (T/2 + T_r/2) \quad (6)$$

Integrators 15 and 16 thus perform the computation, $$(T/2 - T_r/2)(T/2 + T_r/2) \quad (7)$$

which is directly proportional to $d - d_r$. By adding the known constant, $d_r$, it is possible to arrive at absolute density.

Use of $d_r$ makes possible a more accurate computation and signal transmission because only the difference $d - d_r$ is computed and transmitted, and not absolute density, d.

Note that, $$d = A(T^2 - T_r^2) + d_r \quad (8)$$

where, $$d_r = AT_r^2 + B \quad (9)$$

Equation (8) gives the output of amplifier 17 in terms of a voltage directly proportional to $d$.

As stated previously, a voltage to current converter may be employed anywhere in the system of FIG. 1. Such a converter may employ a Darlington circuit or otherwise. By this reference hereto, said copending application, in its entirety, is incorporated herein as fully set forth herein hereat.

As stated previously, counter 24 may be adjustable to adjust the predetermined count thereof. Note will be taken that the input signal to the scale factor circuit 20 of FIG. 6 on lead 74 is a D.C. voltage which is directly proportional to $d - d_r$. On the other hand, the output of amplifier 17 is a D.C. voltage directly proportional to d only.

The word "spaced" as used herein is hereby defined to include pulse spacing from center to center. However, this definition does not exclude a spacing which is measured in some other way.

The word "densitometer" is hereby defined for use herein and in the claims to include a device which may or may not have utilization means 21 as described herein.

What is claimed is:

1. A vibration densitometer comprising: an electromechanical oscillator to produce an alternating output signal having a period such that the density of a detected fluid varies in accordance therewith; first means connected from said oscillator to produce a first train of pulses of a period, $T$, directly proportional to said oscillator output signal period, each pulse having a width $T/2$, the spacing between adjacent pulses being $T/2$; second means connected from said first means to receive said pulse train and to convert it to another pulse train of the same period, $T$, but of a pulse width, $(T/2 - T_r/2)$, where $T_r$ is a constant, the time between the trailing edge of one pulse in the other train to the leading edge of the next succeeding pulse therein thereby being $(T/2 + T_r/2)$; third means connected from said second means to receive said other pulse train and to produce an output signal directly proportional to the product, $(T/2 - T_r/2)(T/2 + T_r/2)$; fourth means connected from said third means to produce an output signal directly proportional to $d = A(T^2 - T_r^2) + d_r$ where $d_r = AT_r^2 + B$, and A and B are constants; and utilization means connected from said fourth means.

2. The invention as defined in claim 1, wherein said third means includes a first integrator connected from said second means to receive said other pulse train and to integrate to a maximum amplitude directly proportional to $(T/2 - T_r/2)$ during each pulse of said other train, and a second integrator connected from both said second means and said first integrator to receive the outputs thereof and to integrate to a maximum amplitude directly proportional to the product, $(T/2 - T_r/2)(T/2 + T_r/2)$ during each interval between each pair of immediately adjacent pulses in said other train, the output of said second integrator increasing linearly for each said interval, $(T/2 + T_r/2)$, at a rate directly proportional to the output signal magnitude of said first integrator.

3. The invention as defined in claim 1, wherein said fourth means output signal is a D.C. voltage, said utilization means including a D.C. voltmeter calibrated in density.

4. A vibration densitometer comprising: an electromechanical oscillator to produce an alternating output signal having a period such that the density of a detected fluid varies in accordance therewith; first means to produce a first train of pulses of a period, $T$, directly proportional to said oscillator output signal period, each pulse having a width $T/2$, the spacing between adjacent pulses being $T/2$; second means connected from said first means to receive said pulse train and to convert it to another pulse train of the same period, $T$, but of a pulse width, $(T/2 - T_r/2)$, where $T_r$ is a constant, the time between the trailing edge of one pulse in the other train to the leading edge of the next succeeding pulse therein thereby being $(T/2 + T_r/2)$; and third means connected from said second means to receive said other pulse train and to produce an output signal directly proportional to the product, $(T/2 - T_r/2)(T/2 + T_r/2)$; said third means including a first integrator connected from said second means to receive said other pulse train and to integrate to a maximum amplitude directly proportional to $(T/2 - T_r/2)$ during each pulse of said other train, a second integrator connected from both said second means and said first integrator to receive the outputs thereof and to integrate to a maximum amplitude directly proportional to the product, $(T/2 - T_r/2)(T/2 + T_r/2)$ during each interval between each pair of immediately adjacent pulses in said other train, the output of said second integrator increasing linearly for each said interval, $(T/2 + T_r/2)$, at a rate directly proportional to the output signal magnitude of said first integrator; a monostable multivibrator, a differentiator connected from said first means to said multivibrator to cause it to generate an output pulse during a portion of the width of each pulse in said other train when the output of said second integrator is a maximum, a sample and hold circuit actuable by said multivibrator output to sample the output of said second integrator and hold the same between the output pulses of said multivibrator, a scale factor circuit connected from said sample and hold circuit to produce an output signal directly proportional to $$d = A(T^2 - T_r^2) + d_r$$

where, $d_r = AT_r^2 + B$, and

A, B and $T_r$ are constants, and means calibrated in density connected from said scale factor circuit to indicate the magnitude of d.

* * * * *